(12) United States Patent
Tokida et al.

(10) Patent No.: US 8,259,364 B2
(45) Date of Patent: Sep. 4, 2012

(54) IMAGE SENSOR

(75) Inventors: Naoyuki Tokida, Tokyo (JP); Takafumi Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1168 days.

(21) Appl. No.: 11/845,328

(22) Filed: Aug. 27, 2007

(65) Prior Publication Data

US 2008/0204824 A1 Aug. 28, 2008

(30) Foreign Application Priority Data

Feb. 26, 2007 (JP) ................................ 2007-045476

(51) Int. Cl.
*H04N 1/00* (2006.01)
*H04N 1/40* (2006.01)
*H04N 1/387* (2006.01)

(52) U.S. Cl. ......... 358/461; 358/496; 358/447; 358/446

(58) Field of Classification Search .................. 358/445, 358/446, 461, 496, 497, 463, 465, 466, 474, 358/1.9, 3.22, 3.26; 382/270–275, 251–265

See application file for complete search history.

(56) References Cited

U.S. PATENT DOCUMENTS

| | | | | |
|---|---|---|---|---|
| 5,489,992 | A * | 2/1996 | Endo | 358/482 |
| 5,892,590 | A * | 4/1999 | Ida et al. | 358/406 |
| 6,025,933 | A | 2/2000 | Ohashi | |
| 6,275,307 | B1 * | 8/2001 | Segawa | 358/446 |
| 6,917,451 | B2 * | 7/2005 | Waragai et al. | 358/461 |
| 6,969,838 | B2 | 11/2005 | Endo et al. | |
| 7,166,827 | B2 * | 1/2007 | Sugihara et al. | 250/208.1 |
| 7,515,310 | B2 * | 4/2009 | Llewellyn et al. | 358/446 |
| 2002/0110389 | A1 * | 8/2002 | Ozawa | 399/177 |
| 2002/0140992 | A1 * | 10/2002 | Konagaya | 358/461 |
| 2005/0006562 | A1 | 1/2005 | Sugihara et al. | |
| 2007/0165286 | A1 | 7/2007 | Endo et al. | |

FOREIGN PATENT DOCUMENTS

| | | |
|---|---|---|
| EP | 1 818 876 A1 | 8/2007 |
| JP | 6-37972 | 2/1994 |
| JP | 11-187198 | 7/1999 |
| JP | 2002-366942 | 12/2002 |
| JP | 2004-7542 | 1/2004 |
| JP | 2006-121598 | 5/2006 |
| JP | 2006121598 A * | 5/2006 |

OTHER PUBLICATIONS

Extended European Search Report issued on Mar. 18, 2011 in corresponding European Application No. 07 01 7149.

* cited by examiner

*Primary Examiner* — Twyler Haskins
*Assistant Examiner* — Chad Dickerson
(74) *Attorney, Agent, or Firm* — Oblon, Spivak, McClelland, Maier & Neustadt, L.L.P.

(57) ABSTRACT

An image sensor includes: a light transmissive member extending in a direction orthogonal to a direction of conveying the document; a reference portion provided outside the conveying region where a document is conveyed with respect to the orthogonal direction and having a transmittance lower than a transmittance of in the conveying region of the light transmissive member; and a light source unit. The image sensor further includes: a lens unit converging the light transmitting through the document and the reference portion; a light receiving unit that receives the light transmitted through the lens unit and outputs an electric signal; an amplifying unit that amplifies the electric signal of the document corresponding to the conveying region and outputs an image signal of the document; and a controlling unit configured to control an amplification factor of the amplifying unit based on the electric signal corresponding to the reference portion.

10 Claims, 9 Drawing Sheets

80

80

IMAGE SENSOR

CROSS-REFERENCE TO RELATED APPLICATIONS

This application is based upon and claims the benefit of priority from Japanese Patent Application No. 2007-045476, filed on Feb. 26, 2007, the entire contents of which are incorporated herein by reference.

BACKGROUND OF THE INVENTION

1. Field of the Invention

The present invention relates to an image sensor for use in an image inputting apparatus for reading an image such as a copier, a facsimile, etc.

2. Description of the Related Art

As an example of an image sensor for reading image information of a transmissive document or the like, FIG. 2 of JP-A-6-037972 (hereinafter referred to as "Patent Document 1") discloses an image reading apparatus capable of reading a transmissive document. The image reading apparatus includes an upper moving unit that includes: a transparent plate for pressing the document; a transmitting light source for the transmissive document; and a reflecting plate 16 for a reflecting document.

Further, paragraph number 0038 of JP-A-2002-366942 (hereinafter referred to as "Patent Document 2) discloses an image reading system in which a peripheral edge portion of a document plate is provided with a white reference for a reflective document that has a uniform reflecting surface of high reflectance, and at a time of reading a film, light irradiated from a planer light source portion of a transmissive document unit is incident on a linear sensor through white reference windows of film holders.

However, although Patent Document 1 discloses the image reading apparatus for reading the transmissive document, Patent Reference 1 does not describe a specific configuration of enabling to read a stable high quality image even by a change in an environment of use or the like. Therefore, an image output is changed by TCR (temperature characteristic) provided to a mounted illuminating element (light emitting element) in accordance with a change in an environment of use or the like, which brings about unstable reading image quality. Further, a reading quality is deteriorated by a reduction in luminance in accordance with an aging change of an illuminating element caused by a long period of time of use.

Although Patent Document 2 discloses the image reading system that directly irradiates the document table through a white reference window installed at a folder of the film of the transmissive document unit 37 for determining whether the document is the transmissive document (film) or a reflective document, Patent Reference 2 does not teach an improvement of a reading quality of an image for the transmissive document.

Hence, it is an object of the invention to provide a novel image sensor capable of reducing a deterioration in the accuracy of reading the document.

SUMMARY OF THE INVENTION

According to an aspect of the invention, there is provided an image sensor comprising: a light transmissive member including a region corresponding a region where a document is conveyed, and extending in a direction orthogonal to a direction of conveying the document; a reference portion provided outside the conveying region with respect to the orthogonal direction and having a transmittance lower than a transmittance of in the conveying region of the light transmissive member; a light source unit that irradiates light to the conveying region and the reference portion; a lens unit arranged to be opposed to the light source unit for converging the light transmitting through the document conveyed in the conveying region and the reference portion; a light receiving unit that receives the light transmitted through the lens unit and outputs an electric signal; an amplifying unit that amplifies the electric signal of the document corresponding to the conveying region of the light receiving unit and outputs an image signal of the document; and a controlling unit configured to control an amplification factor of the amplifying unit based on the electric signal corresponding to the reference portion of the light receiving unit thereby increasing or reducing an image output signal of the amplifying unit.

DETAILED DESCRIPTION OF THE PREFERRED EMBODIMENTS

Embodiment 1

Figure 1:
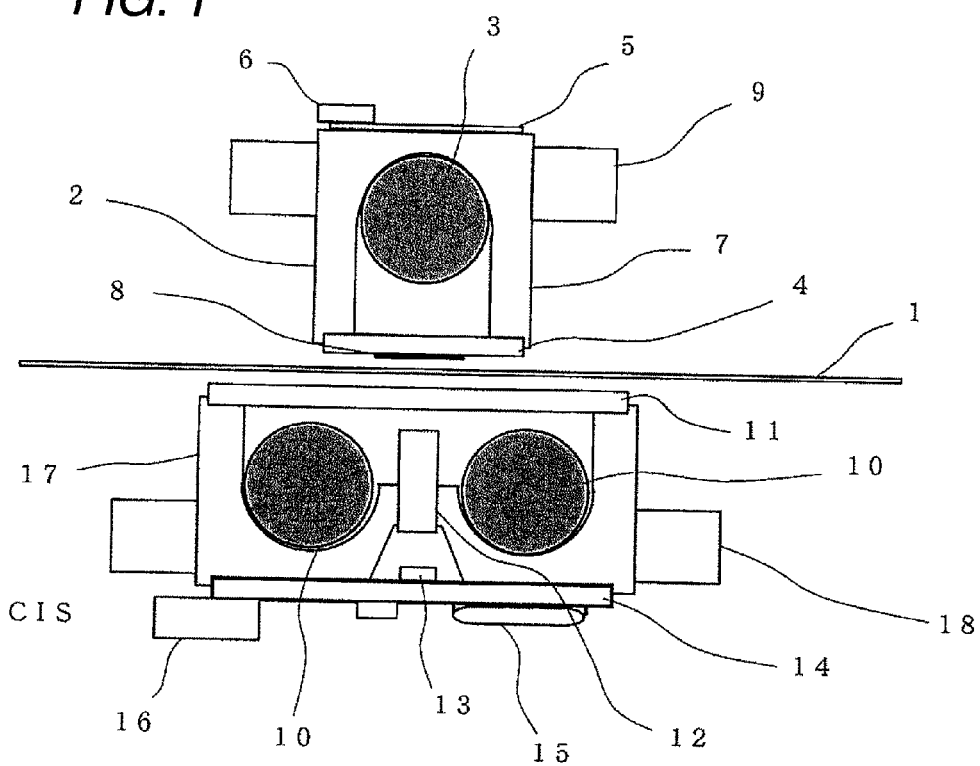
FIG. 1 is a sectional view of an image sensor according to Embodiment 1.

An image sensor according to Embodiment 1 of the invention will be explained as follows. FIG. 1 is a cross-sectional structural diagram of an image sensor according to Embodiment 1. In FIG. 1, numeral 1 designates a document such as a bank note, a stock a bond, a check, etc., having a watermark or a transmissive region. Numeral 2 designates a transmissive light source portion which is provided outside a main unit of a contact image sensor (hereinafter, also referred to as CIS) to interpose the document 1. Numeral 3 designates light source means of the transmissive light source portion 2 that includes a fluorescent lamp or a cold cathode or the like in a circular column shape or a rod-like shape extending, for example, in a main scanning direction (direction orthogonal to paper face of FIG. 1). Otherwise, the light source means 3 may include: a light guide member having a circular column shape or a rod-like shape; and a light source (LED or the like) arranged at an end portion of the light guide member. Numeral 4 designates a transmissive member such as a glass material or a transparent resin for transmitting light for allowing light emitted from the light source means 3 to be incident on a side of CIS. Numeral 5 designates a board for driving the light source means 3, numeral 6 designates a connector for driving the light source means 3, numeral 7 designates a cabinet of the transmissive light source portion 2 for storing and holding the light source means 7, the transmissive member 4 and the board 5. Numeral 8 designates a reference portion (semitransparent portion) including a semitransparent region formed on the transmissive member 4. The reference portion 8 is formed on an end portion of the transmissive member 4, which is outside of a region of the transmissive member 4 with respect to the main scanning direction, where the region faces a region in which the document 1 is conveyed. Further, the semitransparent portion 8 may be provided on one end portion of the transmissive member 4, and also may be formed on both end portions thereof. The light source means irradiates light to the semitransparent portion 8 in addition to the region where the document 1 is conveyed. Numeral 9 designates an attaching portion for the transmissive light source portion 2, which is fixed to, for example, a main unit of a reading system (not illustrated) of a monetary terminal apparatus or the like.

Next, a configuration of the CIS side will be explained. In FIG. 1, numeral 10 designates a reflective type light source portion that includes a fluorescent lamp or a cold cathode or the like having a circular column shape or a rod-like shape extending in a main scanning direction. In the configuration shown in FIG. 1, two light source portions 10 are arranged. Further, two the light source portions 10 may have similar configurations to those of the light source means 3. Numeral 11 designates a glass plate (transmissive member) for transmitting light. Numeral 12 designates a rod lens array. Light emitted from the transmissive light source means 3 transmits through a region where the document 1 is conveyed and the semitransparent portion 8 of the transmissive member 4. Further, the light transmits through the glass plate 11 and then is converged by the rod lens array 12. On the other hand, light emitted from the reflective light source portion 10 transmits through the glass plate 11 and is reflected by the document 1. The reflected light transmits through the glass plate again and is converged by the rod lens array 12. Numeral 13 designates a light receiving portion (sensor IC) for receiving light converged by the rod lens array 12 which is integrated with a photoelectric conversion portion and a drive circuit thereof or the like. The light receiving portion 13 receives and detects light emitted from the reflective light source portion 10. Further, the light receiving portion 13 receives and detects light transmitted through the region of conveying the document 1 and the semitransparent portion of the transmissive transmissive member 4 and converged by the rod lens array 12. Numeral 14 designates a sensor board mounted with a plurality of pieces of the light receiving portion 13.

Numeral 15 designates a signal processing IC (ASIC) for outputting an image signal obtained from image information of the document 1 as an image signal. The signal processing IC 15 is integrated with an A/D converter for subjecting an analog signal photoelectrically converted by the light receiving portion 13 to A/D conversion in order to convert into a digital signal, a correcting circuit for subjecting a signal output of each pixel (bit) after A/D conversion to a shading correction or an all bit correction. Numeral 16 designates a connector for supplying a start signal (SI) or a clock signal (CLK) for driving CIS, supplying power to the connector 6 of the transmissive light source portion 2 at a time of driving the transmissive light source portion 2, and outputting a content of the document 1, that is, the image signal obtained by reading the image information to an external. Numeral 17 designates a cabinet of CIS for storing and holding the reflective light source portion 10, the rod lens array 12 and the sensor board 14. Numeral 18 designates an attaching portion of CIS for fixing the CIS to the main unit of the reading system.

In this way, as shown by FIG. 1, the image sensor according to Embodiment 1 containing the transmissive image sensor including the transmissive light source portion 2, the rod lens array 12 and the sensor IC 13, and containing a reflective image sensor including the reflective light source portion 10, the rod lens array 12 and the light receiving portion 13. Further, the rod lens array 12 and the light receiving portion 13 are commonly used in these image sensors, and the document 1 is conveyed between the transmissive member 4 and the glass plate 11. That is, the image sensor is configured as a whole by combining the transmissive light source portion 2 and CIS as the reflective image sensor.

Figure 2:
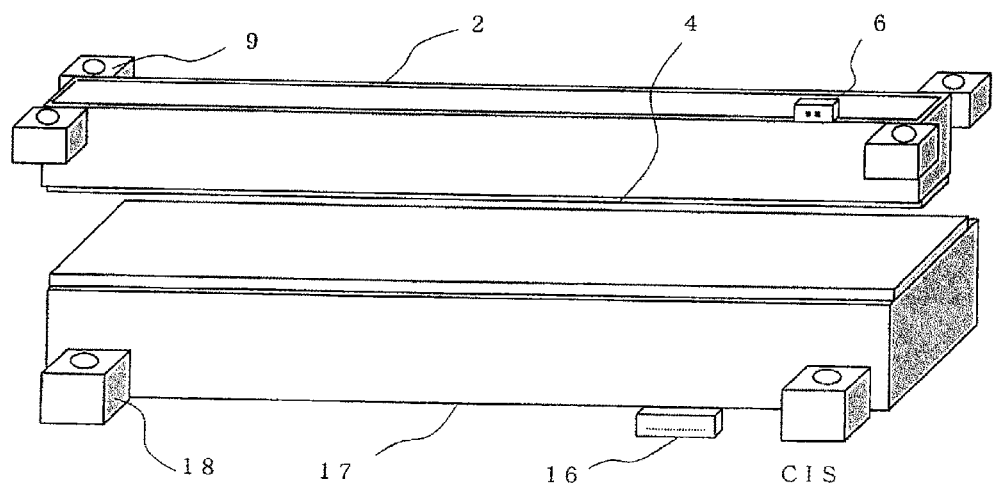
FIG. 2 is an external view of the image sensor according to Embodiment 1.
Figure 3:
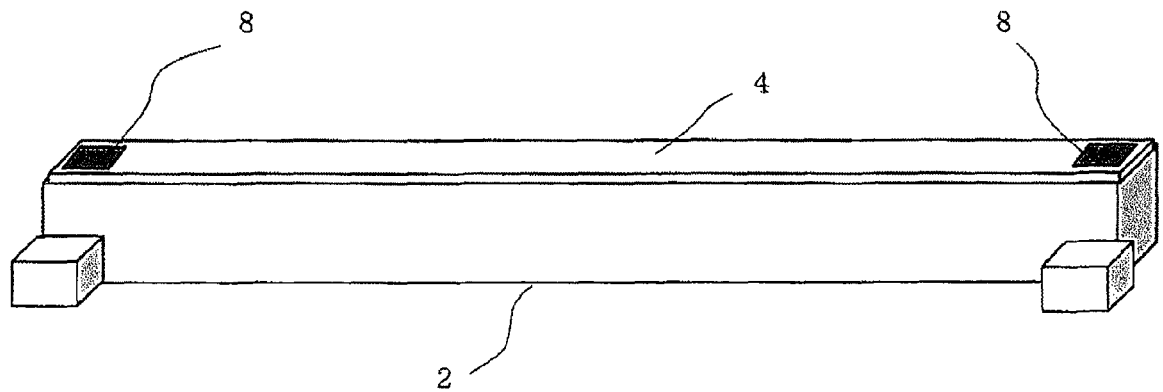
FIG. 3 is an external view of a transmissive light source according to Embodiment 1.

FIG. 2 is an external perspective view of the image sensor according to Embodiment 1. FIG. 3 is an external perspective view of the transmissive light source portion 2. The reference portions 8 are installed at both end portions in the main scanning direction (direction of reading the document 1). In FIGS. 1 to 3, the same symbols designate the same or corresponding elements.

Now, in the image sensor according to Embodiment 1, when image (picture image) information of the document 1 is read by using the reflective light source portion 10 mounted inside the CIS, the document 1 is irradiated from a skewed direction by switching ON the light source portion 10. Reflected (scattered) light reflected by the document 1 is received by the light receiving portion 13 by way of the rod lens array 12 and is photoelectrically converted at the light receiving portion 13.

On the other hand, in the image sensor, when image information of the document 1, that is, the watermark or the transmitting portion of the document 1 is read by using the light source means 3 of the transmissive light source portion 2 installed outside the CIS, the document 1 is irradiated by switching ON the light source means 3, transmitted light transmitted through the document 1 is received by the sensor IC 13 by way of the rod lens array 12 and is photoelectrically converted at the sensor IC 13. In this case, irradiating light of the light source means 3 is irradiated in a direction orthogonal to the document 1, and therefore, direct light transmitted through the document 1 is received by the light receiving portion 13 by way of the rod lens array 12 and is photoelectrically converted.

Figure 4:
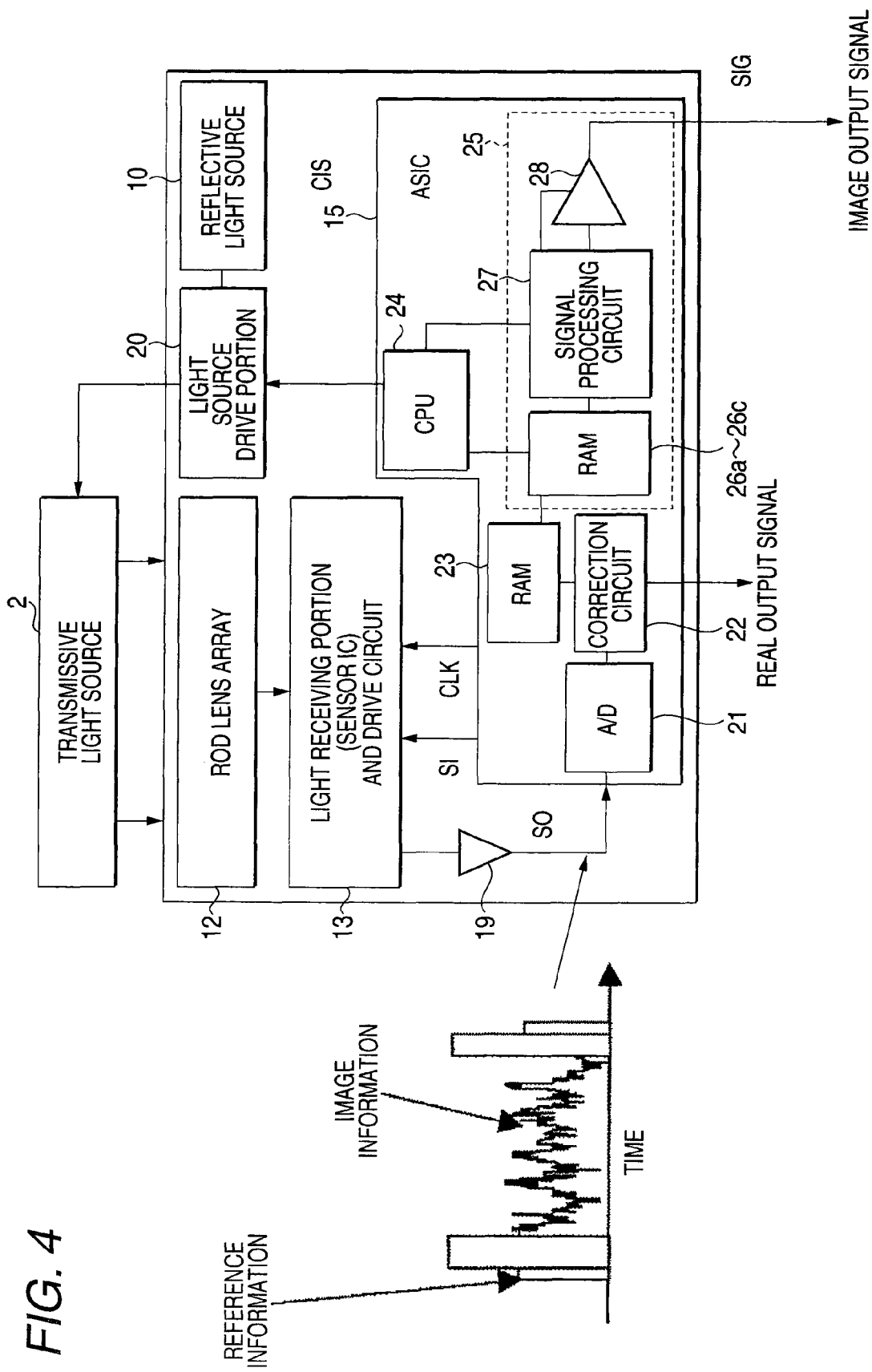
FIG. 4 is a block diagram of the image sensor according to Embodiment 1.

FIG. 4 is a block diagram of a entire configuration of the image sensor according to Embodiment 1. This block diagram shows the CIS side configuration such as the signal processing IC (ASIC) 15, the rod lens array 12, the light receiving portion 13 with a drive circuit and the like and the transmissive light source portion 2, in addition to a waveform diagram of an analog signal (SO) after amplifying an output signal of the light receiving portion 13. In FIG. 4, a clock signal (CLK) and a start signal (SI) in synchronism therewith are outputted from the signal processing IC (ASIC) 15 to the drive circuit, and an analog signal is outputted from the light receiving portion 13 at a timing thereof. The waveform diagram in FIG. 4 indicates the analog signal after the amplifier 19 amplifies the output signal of the light receiving portion 13. Specifically, the waveform diagram shows image information of the document 1, reference information of the reference portion 8, and information between the document 1 and the reference portion 8. The analog signal (SO) is converted into a digital signal by an A/D converter 21 of the signal processing IC (ASIC) 15 and is subjected to a shading correction including sample hold or an all bit correction or the like by a correcting circuit 22. Correction by the correcting circuit 22 is carried out by: reading a reference signal from RAM 23 previously stored with a reference signal data; and operating to process a digital signal in correspondence with the A/D converted image information.

In this case, when the transmissive light source portion 2 is used, by switching ON the transmitting light source means 3 and switching OFF the reflective light source portion 10 by a light source drive circuit 19, the light receiving portion 13 receives and photoelectrically convert light transmitted through a state in which the document 1 is not present or through a pertinent transparent document, and the transmitted light can be applied to a correction data in actual operation as a reference signal data of RAM 23. In actual operation, normally, a reading signal subjected to A/D conversion or correction is transmitted to the reading system as an REAL output signal as it is to reproduce the image or identify the image.

Such a series of operation is carried out by a control of CPU 24 in the signal processing IC 15. The correction data or the reference signal data is for correcting a variation among respective elements of the light receiving portion 13 and the rod lens array 12. Therefore, the correction data may be formed by using a correction plate or a white color reference document for reference by using the reflective light source portion 10 mounted on the CIS side. Further, in FIG. 4, the signal processing IC 15 includes a signal processing portion that contains: a signal processing circuit 27 for processing a line data stored in RAM 26a to 26c, and a digital variable amplifier 28 for subjecting an output of the signal processing circuit 27 and reference information of a photoelectrically converted output of the light receiving portion 13 in correspondence with the reference portion 8 to an operation processing for collation or comparison, thereby outputting an image output signal (SIG)

Next, the reference portion 8 will be explained. As shown in FIG. 3, the reference portions 8 are formed at both sides of a surface of the transmissive member 4 outside the region of conveying the document 1. When the document 1 is a reflective document, that is, when the document 1 is not provided with a watermark or a transmitting portion, almost all of light emitted from the transmissive light source portion 2 is reflected by the reflective document, and is hardly incident on the light receiving portion 13. Therefore, an explanation will be given of a case in which the document 1 is a transmissive document, that is, the document 1 is provided with the transmitting portion. Light emitted from the transmissive light source portion 2 transmits through the transmitting portion of the document 1 and thereafter, incident on the light receiving portion 13. However, since a width in the direction orthogonal to the direction of conveying the document 1 is normally narrower than an irradiating region of the transmissive light source portion 2, there is also light directly incident on the light receiving portion 13 without transmitting through the document 1.

Figure 5:
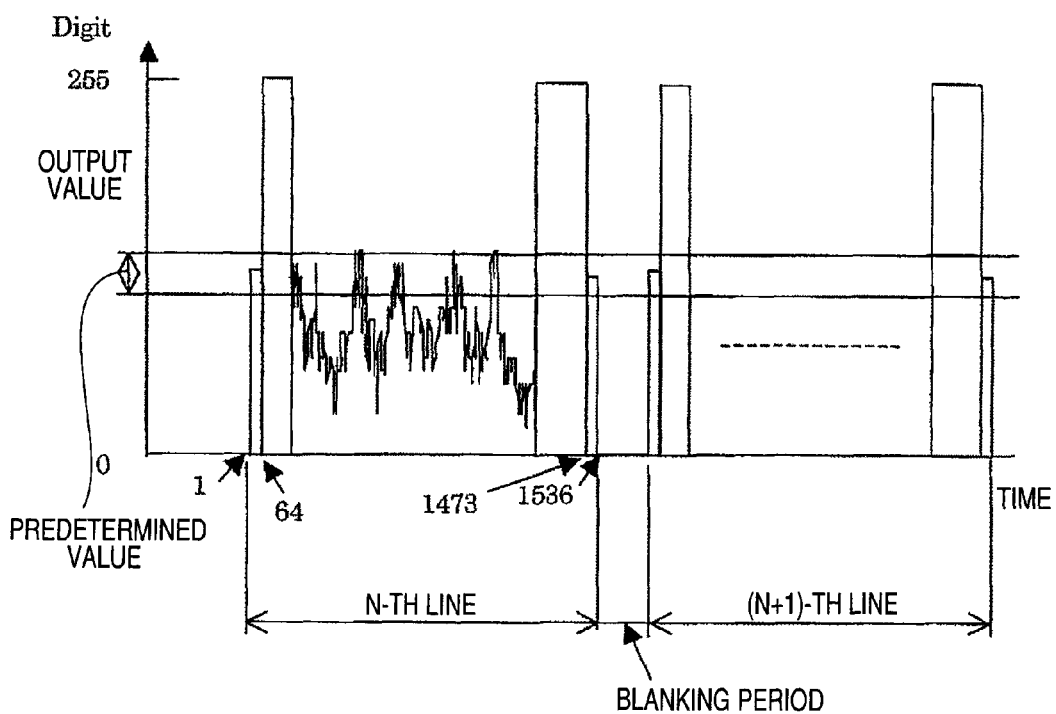
FIG. 5 shows a waveform of the image sensor according to Embodiment 1.

FIG. 5 is a waveform diagram showing a digitally converted output waveform after photoelectric conversion on the CIS side when the document 1 is read by using the transmissive light source portion 2. In Embodiment 1, an explanation will be given of a case of a pixel number 1356 bits (elements) by constituting a resolution of the light receiving portion 13 subjected to A/D conversion to 400 dpi (alignment pitch 0.0635 mm). According to an output value of the output waveform, an output after correction is displayed by 8 bits resolution (256 stages digit), the higher the numerical value, the higher the photoelectrically converted output. FIG. 5 shows a photoelectrically converted output waveform of light incident on a region of the light receiving portion 13 in correspondence with the reference portion 8 provided at one end (vicinity of pixel positions 1 through 64) with respect to a total reading width of CIS. Also, FIG. 5 shows the output waveform successively reading a region in which the document 1 is not present, reading a region in which the document 1 is present, reading a region at which the document 1 is not present at other end side and finally reading a region of the light receiving portion 13 in correspondence with the reference portion 8 provided at other end (vicinity of pixel positions 1473 through 1356). After reading 1 line, a blanking period is provided, and a next line is read.

Figure 6A:
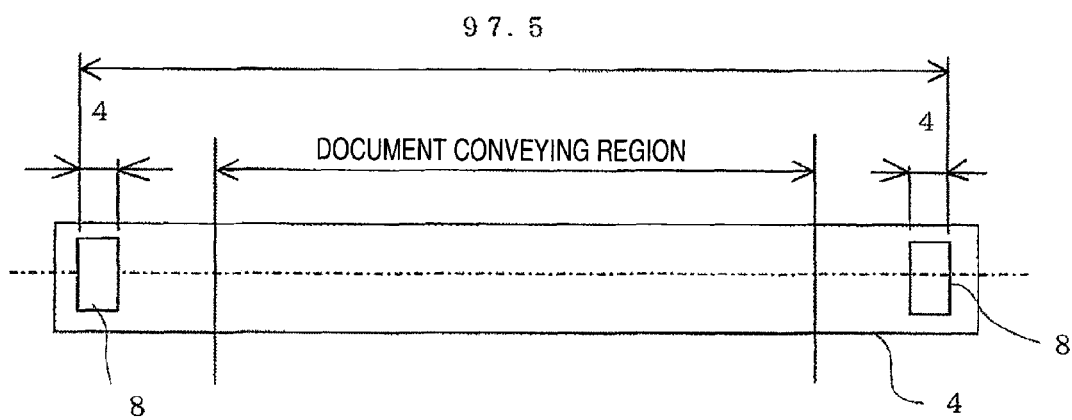
FIGS. 6A and 6B illustrate a transmissive member mounted to a transmissive light source according to Embodiment 1.
Figure 6B:

FIGS. 6A and 6B illustrate explanatory views for explaining positions and sizes of the region of conveying the document 1 and the reference portion 8 of the transmissive member 4. FIG. 6A is a plane view of the transmissive member 4, FIG. 6B is a side view of the transmissive member 4.

Figure 7:
FIG. 7 is a diagram for explaining roughening of a surface of a reference portion of the transmissive member according to Embodiment 1.

Further, the reference portion 8 is formed with a recessed and projected portion of about 0.02 mmp-p as shown in FIG. 7 by roughening a surface portion of the transmissive member 4 by a chemical treatment of roughening the surface of the transmissive member 4 by hydrofluoric acid or the like or a physical grinding processing of a sandblasting method or the like. When light is incident on the reference portion 8 formed in this way, as shown by the output waveform diagram of FIG. 5, a portion of light is scattered and reflected, and therefore, a transmittance can be reduced, thereby, the output waveform of the CIS side can be prevented from being brought into a saturated state. Further, a range of a predetermined value is set to the output waveform, and the range of the reference signal is set thereby. Further, the reference portion 8 may be provided to the glass plate 11 on the CIS side opposite to the transmissive member 4 provided at the transmissive light source portion 2, to constitute the reference portion 8.

Further, in view of hardware, the reference portion 8 is used to be in conformity with an average transmittance of the read transmissive document 1. That is, when the transmittance of the transmitting transmissive document 1 is high, the transmittance of the reference portion 8 can be reduced by increasing scattering of light by roughening the surface, and when the transmittance of the transmitting transmissive document 1 is low, the transmittance of the reference portion 8 can be increased by reducing scattering of light by roughening the surface. In view of software, the reference portion 8 works for providing reference information for reading the output of the document reading region by a pertinent dynamic range width equal to or smaller than the saturated value when the output value of the region in which the document 1 is not present is the saturated value for the read document 1. In addition, the reference portion 8 also works for providing reference information for amplifying the output value of the document reading region to read by the pertinent dynamic range width when the output value of the region in which the document 1 is not present is equal to or smaller than the saturated value. That is, in a case of the transmissive light source 2 having a comparatively small amount of irradiating light, the output value of the region in which the document 1 is not present is small, and therefore, the output of the document reading region is amplified by an amplifier 28 mounted to the signal processing IC 15 at later stage to provide reference information of widening the dynamic range width.

Further, the reference portion 8 works for reading the document 1 to clearly distinguish an output value of the region in which the document 1 is not present from an output value of the document reading region. That is, since the document 1 does not pass through the reference portion 8 similar to the region in which the document 1 is not present although the surface is roughened, the reference portion 8 is for providing reference information for predicting an output value of the region in which the document 1 is not present from the transmittance.

Figure 8:
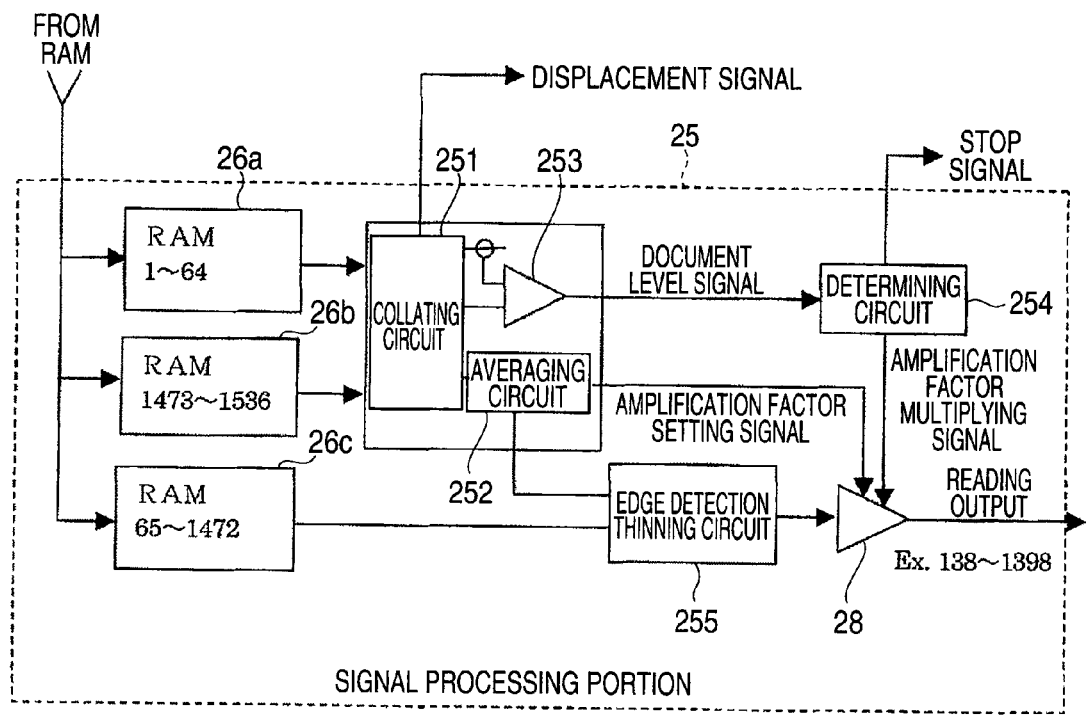
FIG. 8 is a block diagram of a signal processing portion of the image sensor according to Embodiment 1.

Here, FIG. 8 is a block diagram showing a detailed specific configuration of the signal processing portion 25 shown in the block constitution diagram of FIG. 4. Although as shown in FIG. 4, the signal processing portion 25 includes RAMs 26a to 26c, a signal processing circuit 27, a digital variable amplifier 28, in FIG. 8, the signal processing portion 25 includes a collating circuit 251, an averaging circuit 252, a comparator 253, a determining circuit 254 and an edge detection thinning circuit 255. A document level signal is outputted from the comparator 253 to be supplied to the determining circuit 254. When an amplification factor multiplying signal is outputted from the determining circuit 254 to be supplied to the digital variable amplifier 28 for controlling an amplification factor of the digital variable amplifier 28 thereby varying an image reading signal of the digital variable amplifier 28, a control circuit (controlling means) for controlling an output of the image reading signal of the digital variable amplifier 28 can be configured by the collating circuit 251, the comparator 253, and the determining circuit 254.

On the other hand, according to the image sensor shown in FIG. 8, an amplification factor setting signal of the averaging circuit 252 is also supplied to the digital variable amplifier 28, and the image reading signal of the digital variable amplifier 28 is also controlled by the averaging circuit 252. Therefore, in this case, the control circuit is configured by the collating circuit 251, the comparator 253, the determining circuit 254, and the averaging circuit 252. The amplification factor multiplying signal is supplied from the determining circuit 254 to the digital variable amplifier 17, and the amplification factor setting signal is supplied from the averaging circuit 252 to the digital variable amplifier 28. Further, the amplification factor setting signal is also supplied from the average circuit 252 to the edge detection thinning circuit 255. In this case, a control signal for the digital variable amplifier 28 includes the amplification factor multiplying signal and the amplification factor setting signal.

Figure 11:
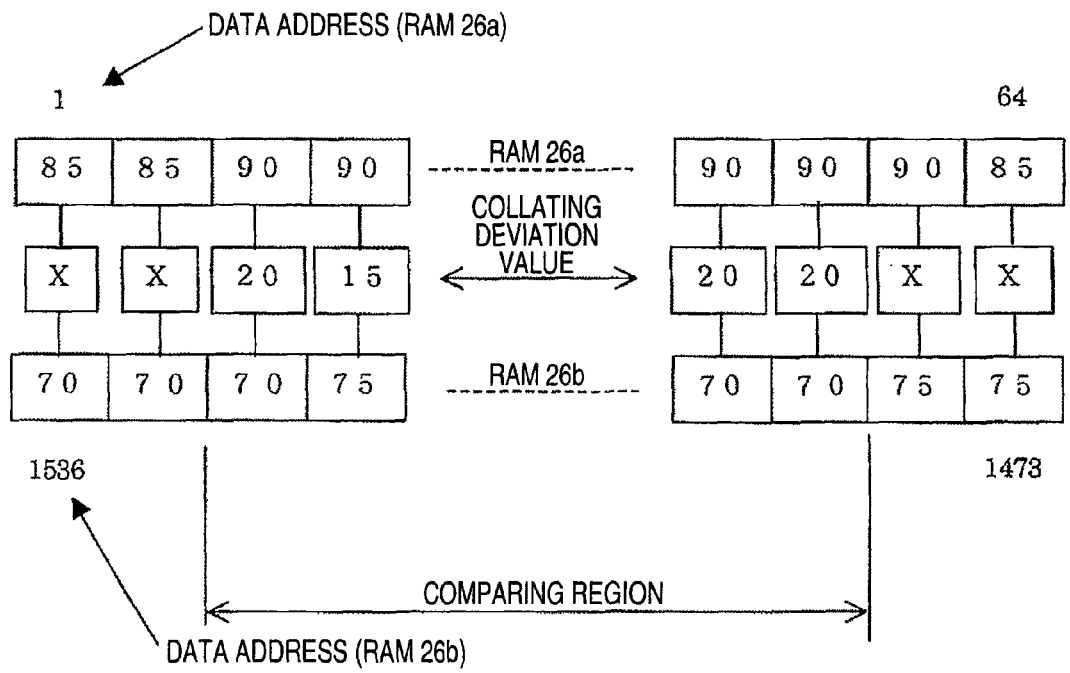
FIG. 11 is a view for explaining a method of collating the image sensor according to Embodiment 2.

The collating circuit will be explained. FIG. 11 is an explanatory view for explaining a collating method of the collating circuit. As shown in FIG. 11, when address data of 1 through 64 bits of RAM 26a and address data of 1473 through 1536 bits of RAM 26b are supplied, the collating circuit 251 collates and outputs collating deviation value data (such as difference value data) as a bit signal by collating bit by bit at a comparing region shown in, for example, FIG. 11. The comparator 253 compares the bit signal of the collating deviation value data supplied from the collating circuit and the reference level signal and outputs the document level signal as the bit signal. The determining circuit 254 determines to which of a small level, a middle level and a large level the data level of the inputted document level signal belongs. Respective level ranges of the small level, the middle level and the large level of the determining circuit are previously set. When it is determined that the document level signal inputted to the determining circuit 254 is determined to be the small level by the determining circuit, a stop signal is transmitted to CPU 24. Then, CPU 24 stops irradiating light of the transmissive light source portion 2 in order to stop the light source drive portion 20 shown in FIG. 4.

On the other hand, when the determining circuit 254 determines the middle level, a constant multiplying (amplifying) signal is supplied to the digital variable amplifier to control to amplify the image output signal at the digital variable amplifier 28. Further, when the determining circuit 254 determines the large level, a constant multiplying (attenuating) signal is supplied to the digital variable amplifier 28 to control to attenuate the image output signal at the digital variable amplifier 28.

The averaging circuit 252 is supplied with the collating deviation value data from the collating circuit 251 and supplies an average value data for respective bits to the digital variable amplifier 28 as the amplification factor setting signal. Then, in the digital variable amplifier 28, although the amplification factor multiplying signal supplied from the determining circuit 254 is the constant multiplying signal at the middle level and the large level, the amplification factor setting signal supplied from the averaging circuit 252 is a set signal averaged for the respective bits. Therefore, an amplifying amount in the digital variable amplifier 28 is determined by multiplying the amplification factor multiplying signal by the amplification factor setting signal.

Further, as shown in FIG. 8, the edge detection/thinning circuit 255 is supplied with an address data of 65 through 1472 bits of RAM 26c and the amplification setting signal of the averaging circuit 252. That is, as shown in FIG. 5, the edge detection/thinning circuit is supplied with the digital signals respectively in correspondence with: the reference portion 8; regions between the reference portion 8 and the document 1; and the region of conveying the document 1. Here, output signal level at outside of the region of conveying the document 1 is substantially the same level, and the transmittance of transmitted light at the reference portion 8 is already known. Therefore, in comparison with the averaged constant value multiplied by a coefficient, a boundary (edge) between the region in which the document is not present except the conveying region and the region in which the document is present in the conveying region can be specified. Hence, in the edge detection/thinning circuit 255, an output of the region at which the document is not present is thinned by starting calculation from a specified edge. A continuous signal after having been thinned in this way constitutes an image signal of reading the document 1 and is inputted to the digital variable amplifier 28. Further, the output of the digital variable amplifier 28 is transmitted to an outside system (not illustrated) as the image output signal (SIG) of the document in the region of conveying the document.

Although according to Embodiment 1, the reference portions 8 are arranged on both outer sides of the conveying region of the transmissive member 4, here, the reference portion 8 may be arranged at either one outer side of the conveying region of the transmissive member 4. In this case, in FIG. 4 and FIG. 8, either one of RAM 26a or RAM 26b is dispensed with. Therefore, there is not the collating circuit in Embodiment 1, and the output signal of RAM 26a or RAM 26b is directly inputted to the comparator 253.

In Embodiment 1, at the signal processing portion 25, the amplifying amount of the digital variable amplifier 28 is automatically varied for each line by using transmitting light from the reference portion 8 for each line. However, when a reading operation is performed during a time period of transmitting 1 sheet of the document, the document level signal and the averaged signal extracted from a first reading line may be fixedly used even at and after a next line. In a case where the document having a number of varying elements is conveyed, a change in an image quality accompanied thereby can be reduced.

Further, when the same kind of sheets of document are conveyed so that little fluctuation in sheets occurs, or when an image quality at a periphery of the document edge can be disregarded such as in determining false of a banknote, the document level signal extracted by the first reading line and the signal processed to average may fixedly be used for a predetermined number of sheets of the document determined by a unit of a cassette.

As described above, according to Embodiment 1, when the transmissive document is read, the end portion of the transmissive member is provided with the reference portion having the semitransparent region of the transmittance of light lower than that of the transmissive member, the output of light passing through the reference portion is collated. When the output of the reference portion is proximate to an upper limit side of a predetermined range, the signal processing portion controls to gradually reduce the amplification factor, and when proximate to a lower limit side, the signal processing portion controls to gradually increase the amplification factor. Therefore, there can be provided an image sensor which does not deteriorate the reading quality even when there is brought about the change in the luminance of the illuminating element by the environment of use or the aging change.

Next, the image sensor shown in FIG. 8 will be further described. When a preceding line in the scanning direction of the document 1 is read, the reading data corrected by the correction circuit 22 is inputted to the RAM 23 and is transferred from the RAM 23 to the RAMs 26a to 26c. The reading data are stored in the RAMs 26a to 26c. The data stored to the RAMs 26a and 26b respectively correspond to two of the reference portion 8 provided on the both outer sides of the region of conveying the transmissive member 4, data stored to the RAM 26c correspond to the reading data of the document conveyed in the conveying region of the transmissive member 4. The data stored to the RAMs 26a and 26b are inputted to the collating circuit 251, and at the collating circuit 251, the output level of the level in the predetermined range are compared to find whether respective output levels of the RAM 26a and the RAM 26b are present in the predetermined value range. When either of the output levels of the RAM 26a and the RAM 26b is not present in the predetermined value range, "displacement signal" is outputted to CPU 24 shown in FIG. 4.

Figure 10:
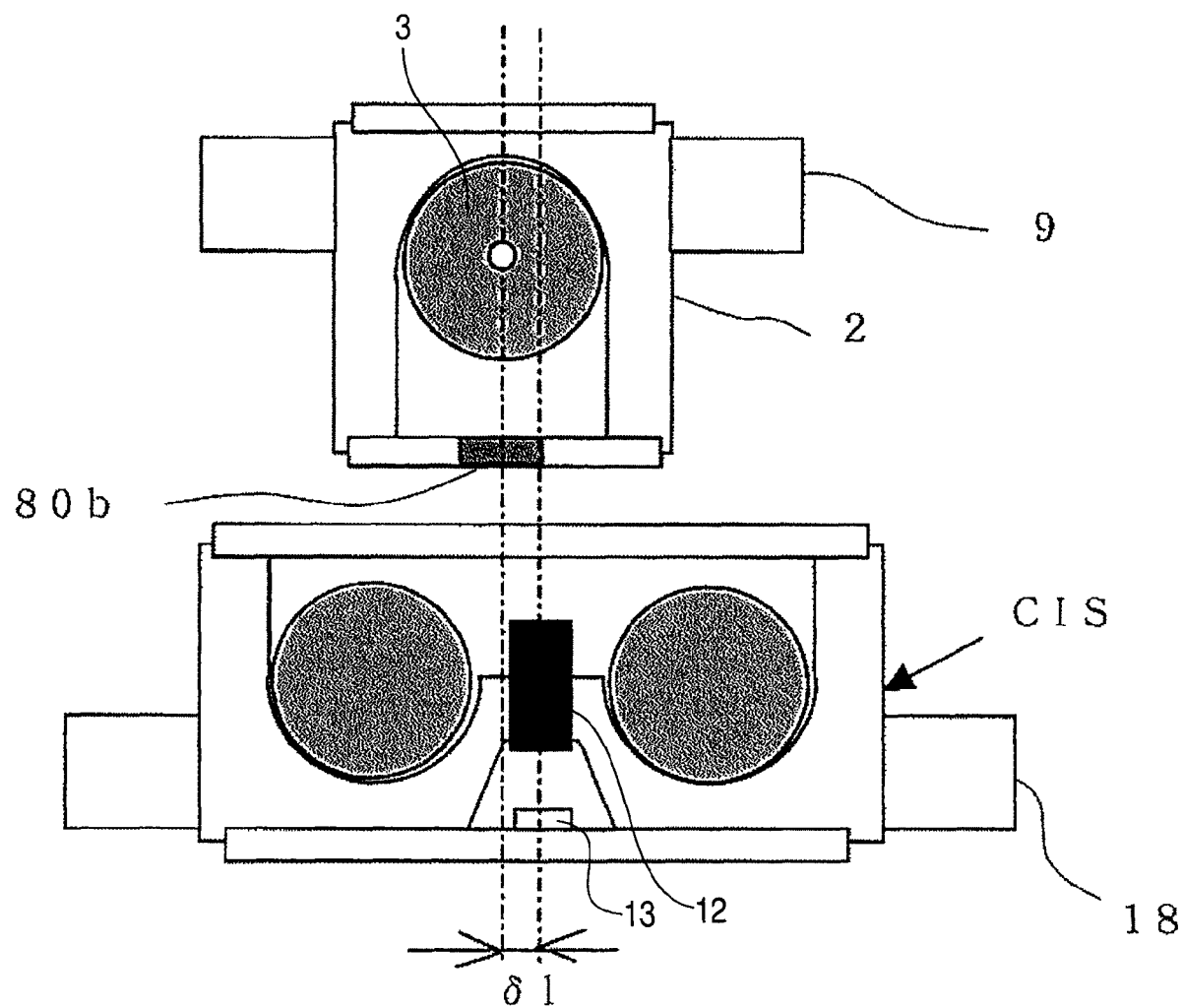
FIG. 10 is a sectional view of an image sensor according to Embodiment 2.

As shown by FIG. 10, a content of the "displacement signal" represents a displacement in the direction of conveying the document between center axes of the transmissive light source means 3 and the rod lens array 12 and the light receiving portion 13, that is, a direction orthogonal to the main scanning direction (sub scanning direction). When there is brought about a constant or more of the displacement, the output level of either or both of the RAM 26a or the RAM 26b is not present in the predetermined range. The collating circuit 251 can also be used for inspecting the displacement. On the other hand, when both of the output levels of the RAM 26a and the RAM 26b are present within the predetermined value range, the document level signal is outputted from the comparator 253 by determining that the above-described displacement falls in the constant range.

Embodiment 2

Figure 9:
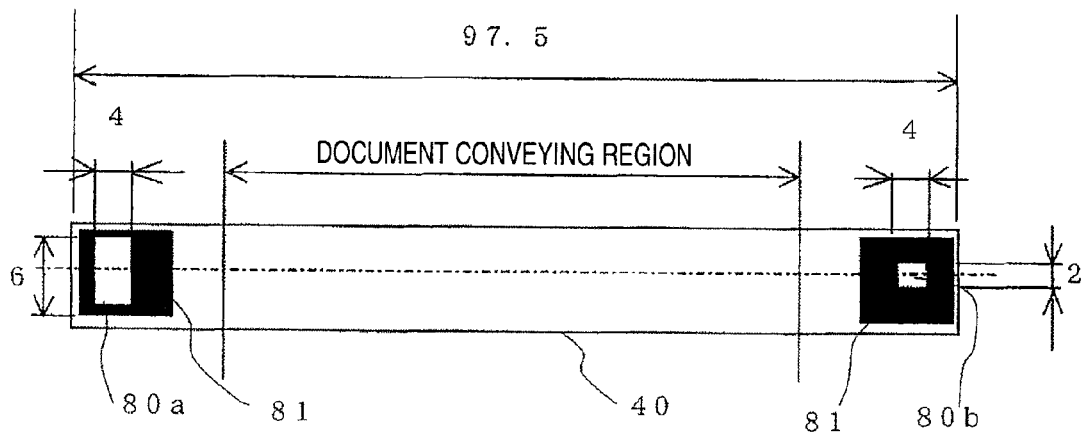
FIG. 9 is a plane view of a transmissive member mounted to a transmissive light source according to Embodiment 2.

Although an explanation has been given of a case of providing the reference portions 8 having the same shape at the both end portions of the transmissive member according to the example of Embodiment 1, in Embodiment 2, an explanation will be given of a case of providing reference portions 80a, 80b having different shapes at the both end portions of the transmissive member 4. FIG. 9 is a plane view for explaining a transmissive member provided with reference portions of the image sensor according to Embodiment 2. In FIG. 9, numeral 40 designates a transmissive member, numeral 80 designates a reference portion, notation 80a designates a reference portion having a wide width in a sub scanning direction, notation 80b designates a reference portion having a narrow width in the sub scanning direction narrower than that of the reference portion 80a. Further, numeral 81 designates a light shielding portion for shielding a surrounding of the reference portion 80 by a black color resin. Further, a surface of the reference portion 80 is roughened by a chemical treatment of roughening a surface of the transmissive member by hydrofluoric acid or the like or by a physical grinding treatment of a sand blasting method or the like similar to Embodiment 1.

In Embodiment 1, a position of a pixel of the light receiving portion 13 in correspondence with the reference portion 8 is specified, and an illuminance range in the sub scanning direction of the transmissive light source 2 is not referred to. However, according to Embodiment 2, an explanation will also be given of a countermeasure against a displacement by an integration error occurring at a time when the transmissive light source 2 and CIS are integrated to the reading system by using the attaching portion 9 and the attaching portion 18 shown in FIG. 1.

As shown in FIG. 9, the reference portions 80 provided at the both ends of the transmissive member 40 has the same size in a main scanning direction. However, with regard to a sub scanning direction, a side of the reference portion 80b is shortened. Further, a description will be given of a case in which an irradiation width (effective irradiation range) of the transmissive light source in the sub scanning direction is about 6 mm.

The transmissive light source 2 and CIS are separated from each other, and therefore, when a side of the reference portion 80a is integrated to the reading system main unit as a positioning reference, as shown by FIG. 10, the side of the reference portion 80b is shifted relative to the light receiving portion 13 by δ1 by an error of attaching of the attaching portion 9 of the transmissive light source 2 and the attaching portion 18 on the CIS side. This results in increasing the illuminance deviation of light incident on the rod lens array 12 within the range of the illuminance width of the sub scanning direction. That is, the reference portion 80b has a slender width, which particularly increases a deviation of the output of the light receiving portion 13 in correspondence with the reference portions 80a, 80b provided at the both ends of the transmissive member 40, in comparison with that in the case of the reference portions having the same size. Therefore, when output values of the reference portion 80a and the reference portion 80b are compared and collated, in a case of having the attaching error, the deviation emerges as the remarkable illuminance deviation. Since the output values of the reference portion 80a and the reference portion 80b are the same in principle, in a case where a collating error is large as shown in FIG. 11, the displacement signal shown in FIG. 8 is generated from the CIS side to CPU 24 as a relative attaching error of the transmissive light source 2 and CIS, and the information is transmitted to the reading system. Further, the light shielding portion 81 is provided for achieving an effect of absorbing unnecessary light of refracting light, diffusing light or the like, thereby accurately entering direct light from the transmissive light source 2 incident on the reference portion 80 into the rod lens array 12.

The light shielding portion 81 is provided to prevent an inherent function of the reference portion 80 from being reduced considerably even when the reference portion 80 is considerably shifted to the sub scanning direction side relative to the corresponding light receiving portion 13. Further, as shown by FIG. 11, a data of the light receiving portion 13 in correspondence with an edge portion of the reference portion 80 is excluded from collating such that collation can be carried out accurately even when there is the displacement in the main scanning direction. Therefore, the comparison is carried out at other region, and the displacement signal is generated for, for example, a collating deviation value exceeding 10 digit. Although in FIG. 11, respective data of the collating region are collated, data subjected to an averaging processing of simply averaging data of RAM 26a and RAM 26b of the collating region may be compared to be collated. Further, configuration other than explained in Embodiment 2 is as explained in Embodiment 1.

Embodiment 3

Although according to Embodiment 2, the light shielding portion 81 is disposed at a periphery of the reference portion 80, according to Embodiment 3, an explanation will be given of a case of shielding a periphery except the reading position of the document conveying region.

Figure 12:
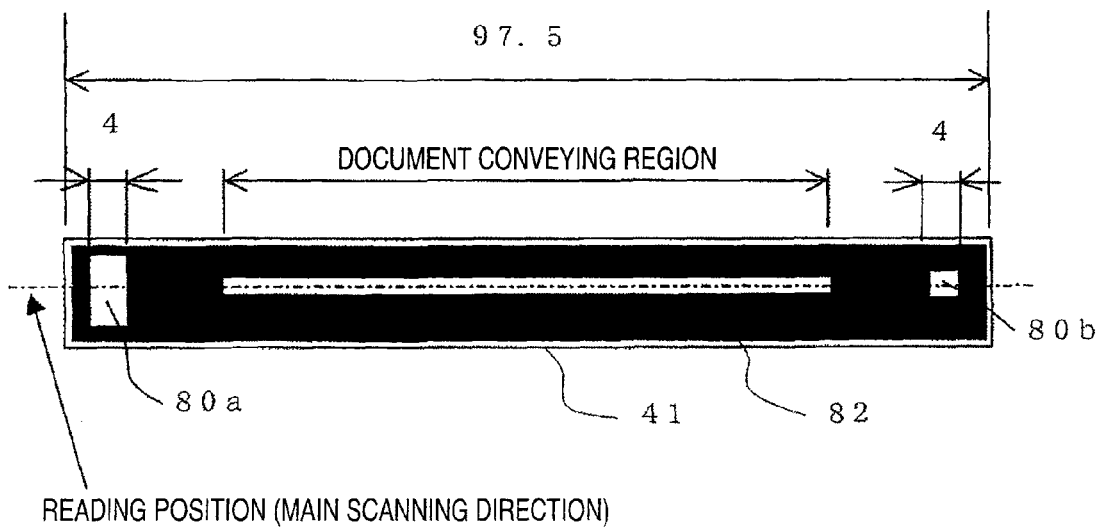
FIG. 12 is a plane view of a transmissive member mounted to a transmitting light source according to Embodiment 3.

FIG. 12 is a plane view for explaining a transmissive member provided with a reference portion according to Embodiment 3. In FIG. 12, numeral 41 designates a transmissive member, numeral 82 designates a light shielding portion including the surrounding of the reference portion 80 and shielding a periphery except the reading position of the region of conveying the document by a black color resin. When a main object of a reading system is reading a bank note or only a characteristic portion of a bank note in which a reading width is specified as in a bank note determining machine, transmitting light is made to be incident on only the region of conveying the document. Further, in FIGS. 9 and 12, the same symbols designate the same or corresponding elements.

Figure 13:
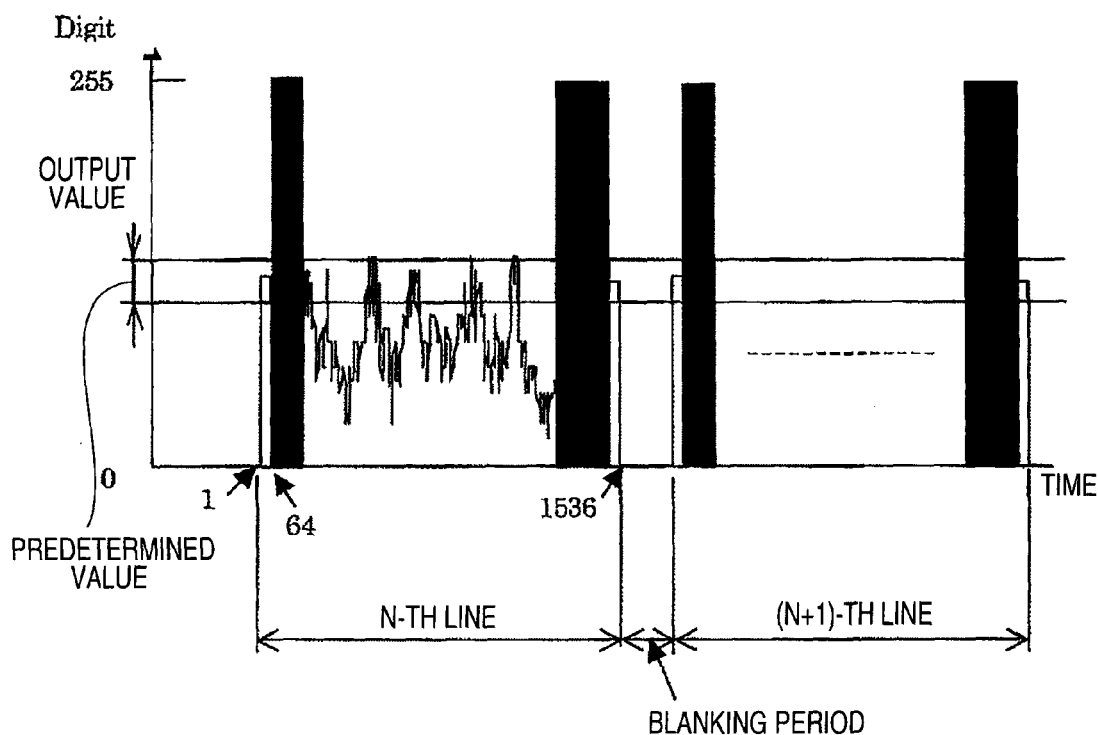
FIG. 13 is a diagram of an output waveform of the image sensor according to Embodiment 3.

FIG. 13 is an explanatory view for explaining an example of an output waveform after photoelectric conversion of CIS that has read the specified document 1 of a bank note or the like. A description will be given of CIS constituting the resolution of the light receiving portion 13 projected to A/D conversion by 400 dpi (alignment pitch 0.0635 mm) and having a pixel number of 1536 bits (elements) similar to Embodiment 1. According to an output value of the output waveform, an output after correction is displayed by 8 bits resolution (256 stages), the hither the numerical value, the higher the photoelectrically converted output. FIG. 13 expresses a photoelectrically converted output waveform of transmitting light incident on the region of the light receiving portion 13 (vicinity of pixel positions 1 through 64) in correspondence with the reference portion 80 provided at one end in all of a reading width in the main scanning direction of CIS.

Also, FIG. 13 shows an output waveform successively reading a region in which the document 1 is not present, reading a region in which the document 1 is present, reading a region in which the document 1 is not present on other end side, finally reading the reference portion 80 provided at other end. After reading 1 line, a blanking period is provided, and a next line is read.

Although in FIG. 13, transmitting light of a region in which the document 1 is not present is incident on the light receiving portion 13 by way of the reference portion 80, the transmitting light is incident thereon only at an effective reading region of the document 1. Therefore, transmitting light of a region in which the document 1 is not present is hardly present in the main scanning direction. Further, with regard to a reading region of the document 1 in the sub scanning direction, unnecessary reflecting light or scattering light is excluded by making a width of opening of the light shielding portion 82 shown in FIG. 12 narrower than the width of the reference portion.

As described above, as shown in FIG. 13, the output of transmitting light provided from the reference portion 80 as shown by the black waveform region (no output) and the output of the region to be read are isolated from each other by the light shielding portion 82. Therefore, there is achieved an effect of facilitating comparing and collating by cutting to divide the data provided from the reference portion 80 and the image signal output (SIG) data even when there is a displacement between the transmissive light source 2 and CIS in the main scanning direction. Also in Embodiment 3, other configuration is similar to that in embodiment 1.

Figure 14:
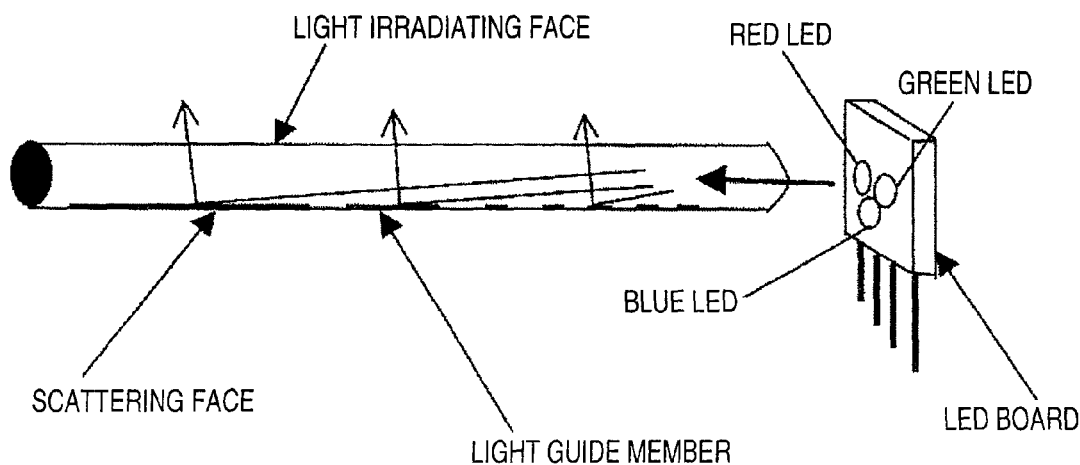
FIG. 14 is an explanatory view for explaining a transmissive light source.

Further, in Embodiments 1 through 3, an explanation has been given such that the light source means 3 includes a fluorescent lamp or a cold cathode tube. However, as the light source means 3, there may be used a rod-like light source having a pentagonal shape in cross section formed by notching one end portion of a quadrangular shape as described in United States patents (U.S. Pat. No. 6,969,838, U.S. Pat. No. 5,489,992), or a rod-like light source having a circular shape in cross section as shown by FIG. 14. That is, a color image can be read by emitting light gradually from an inner portion of a rod-like transmissive member by irradiating a plurality of LED light having different optical wavelengths from an outer portion in a direction of a section in the main scanning direction.

Figure 15A:
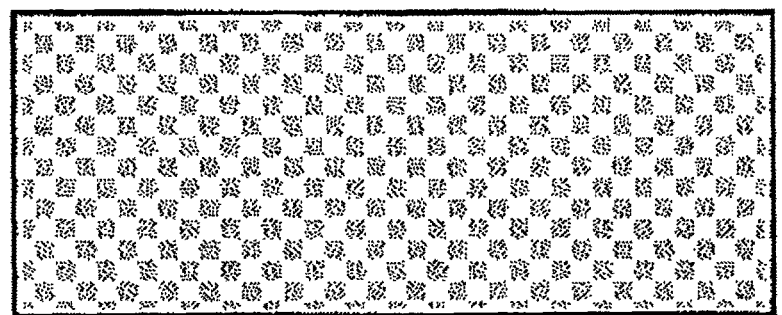
FIGS. 15A and 15B illustrate explanatory views for explaining patterns used in a reference portion of a transmissive member.
Figure 15B:
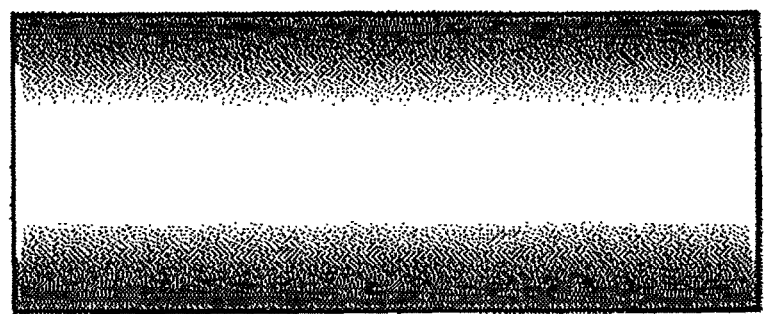

Further, an explanation has been given such that the reference portions 8, 80 are integrally formed by roughening surfaces of the transmissive members 4, 40, 41. However, the reference portions 8, 80 can perform their functions even when a check pattern shown in FIG. 15a or a half tone pattern shown in FIG. 14b is pasted at end portions of and to surfaces or rear faces of the transmissive members 4, 40, 41.

What is claimed is:

1. An image sensor comprising:
   a light transmissive member, which includes a conveying region where a document is conveyed, the light transmissive member extending in a first direction which is (1) orthogonal to a direction of conveying the document and (2) parallel to a face of the conveyed document;
   a reference portion provided on the light transmissive member outside the conveying region of the light transmissive member with respect to the first direction, the reference portion having a transmittance lower than a transmittance of the conveying region;
   a light source unit that irradiates light to the conveying region and the reference portion such that the irradiated light is transmitted through the conveying region and the reference portion;
   a rod lens array, which is arranged to be opposed to the light source unit, the rod lens array extending in a second direction which is orthogonal to the face of the conveyed document, and which contemporaneously converges a first light irradiated from the light source unit which is transmitted through the document conveyed in the conveying region and a second light irradiated from the light source unit which is transmitted through the reference portion outside the conveying region;

a light receiving unit that contemporaneously receives the first light corresponding to the conveying region and the second light corresponding to the reference portion, through the rod lens array, and outputs a first electric signal corresponding to the conveying region and a second electrical signal corresponding to the reference portion;

an amplifying unit that amplifies the first electric signal for the document corresponding to the conveying region of the light receiving unit and outputs an image signal of the document; and a controlling unit that controls an amplification factor of the amplifying unit based on the second electric signal corresponding to the reference portion of the light receiving unit to increase or reduce the outputted image signal of the document in the amplifying unit.

2. An image sensor comprising:

a light transmissive member, which includes a transparent conveying region where a document is conveyed, the light transmissive member extending in a first direction which is (1) orthogonal to a direction of conveying the document and (2) parallel to a face of the conveyed document;

a reference portion, which is semi-transparent, and which is provided on the light transmissive member outside of the conveying region of the light transmissive member with respect to the first direction;

a light source unit that irradiates light to the conveying region and the reference portion such that the irradiated light is transmitted through the conveying region and the reference portion;

a rod lens array, which is arranged to be opposed to the light source unit, the rod lens array extending in a second direction which is orthogonal to the face of a conveyed document, and which contemporaneously converges a first light irradiated from the light source unit that is transmitted through the document conveyed in the conveying region and a second light irradiated from the light source unit that is transmitted through the reference portion;

a light receiving unit that contemporaneously receives the first light corresponding to the conveying region and the second light corresponding to the reference portion, through the rod lens array, and outputs a first electric signal corresponding to the conveying region and a second electrical signal corresponding to the reference portion;

an A/D converting unit that converts the first electric signal corresponding to the conveying region and the second electrical signal corresponding to the reference portion of the light receiving unit into respective conveying region and reference portion digital signals;

an amplifying unit that amplifies the conveying region digital signal based on an amplification factor and outputs an image data signal of the document based on the conveying region digital signal; and a controlling unit that compares the reference portion digital signal with a reference signal and controls the amplification factor of the amplifying unit to bring the reference portion digital signal close to the reference signal, thereby increasing or reducing the image data signal of the document of the amplifying unit.

3. The image sensor according to claim 1, wherein the reference portion includes small recesses and projections provided on a surface of the light transmissive member by a chemical or a physical treatment.

4. The image sensor according to claim 1, wherein the reference portion includes a semi-transparent member pasted to the light transmissive member.

5. The image sensor according to claim 2, wherein the reference portion includes small recesses and projections provided on a surface of the light transmissive member by a chemical or a physical treatment.

6. The image sensor according to claim 2, wherein the reference portion includes a semi-transparent member pasted to the light transmissive member.

7. The image sensor according to claim 1, wherein
the light transmissive member has a surface which faces the face of the conveyed document,
the surface has a long axis extending along the first direction,
the reference portion is provided at distal ends of the surface, and
the conveying region is provided between the distal ends of the surface.

8. The image sensor according to claim 2, wherein
the light transmissive member has a surface which faces the face of the conveyed document,
the surface has a long axis extending along the first direction,
the reference portion is provided at distal ends of the surface, and
the conveying region is provided between the distal ends of the surface.

9. The image sensor according to claim 1, wherein the light receiving unit contemporaneously receives the first light corresponding to the conveying region and the second light corresponding to the reference portion with respect to a common scan line in the first direction.

10. The image sensor according to claim 2, wherein the light receiving unit contemporaneously receives the first light corresponding to the conveying region and the second light corresponding to the reference portion with respect to a common scan line in the first direction.

* * * * *